(12) United States Patent
Frosst et al.

(10) Patent No.: US 10,482,390 B2
(45) Date of Patent: Nov. 19, 2019

(54) INFORMATION DISCOVERY SYSTEM

(71) Applicant: salesforce.com, inc., San Francisco, CA (US)

(72) Inventors: Ian Frosst, South Rawdon (CA); Geoffrey Anderson, Halifax (CA)

(73) Assignee: Salesforce.com, inc., San Francisco, CA (US)

( * ) Notice: Subject to any disclaimer, the term of this patent is extended or adjusted under 35 U.S.C. 154(b) by 958 days.

(21) Appl. No.: 14/879,677

(22) Filed: Oct. 9, 2015

(65) Prior Publication Data
US 2016/0117604 A1 Apr. 28, 2016

Related U.S. Application Data

(60) Provisional application No. 62/068,129, filed on Oct. 24, 2014.

(51) Int. Cl.
*G06N 5/02* (2006.01)
*G06N 20/00* (2019.01)
(52) U.S. Cl.
CPC ............. *G06N 20/00* (2019.01); *G06N 5/02* (2013.01)

(58) Field of Classification Search
None
See application file for complete search history.

(56) References Cited

PUBLICATIONS

Koumenides, A Bayesian Network Model for Entity-Oriented Semantic Web Search, Doctoral Thesis, University of Southampton, Nov. 2013, pp. 1-239.*
Koumenides, A Bayesian Network Model for Entity-Oriented Semantic Web Search, Doctoral Thesis, University of Southampton, Nov. 2013, pp. 1-239 (Year: 2013).*

* cited by examiner

*Primary Examiner* — Wilbert L Starks
(74) *Attorney, Agent, or Firm* — Morris & Kamlay LLP

(57) ABSTRACT

Systems, device and techniques are disclosed for an information discovery system. An element of data may be retrieved. A knowledge point may be extracted from the element of data. The knowledge point may include an aspect of the element of data. The element of data and the knowledge point may be linked with a traversable link. The knowledge point may further be linked to a second element of data. Natural language processing analysis, linguistic analysis, sentiment analysis, and metadata analysis, may be used to determine the aspect of the element of data.

12 Claims, 7 Drawing Sheets

INFORMATION DISCOVERY SYSTEM

PRIORITY

This application claims the benefit of U.S. Provisional Application No. 62/068,129, filed Oct. 24, 2014, the disclosure of which is incorporated by reference in its entirety.

BACKGROUND

Items of information related to a topic may be scattered among many different sources. The items of information and their sources may not all turn up in searches for certain keywords or search terms that are otherwise related to that topic, as the items of information may not include keywords related to the topic that a user might search when attempting to find more items of information related to the topic. This may result in some sources and items of information that are related to a topic being difficult to find through direct keyword searching. Such sources and items of information may be relevant to the topic being searched despite not including the keywords related to the topic.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
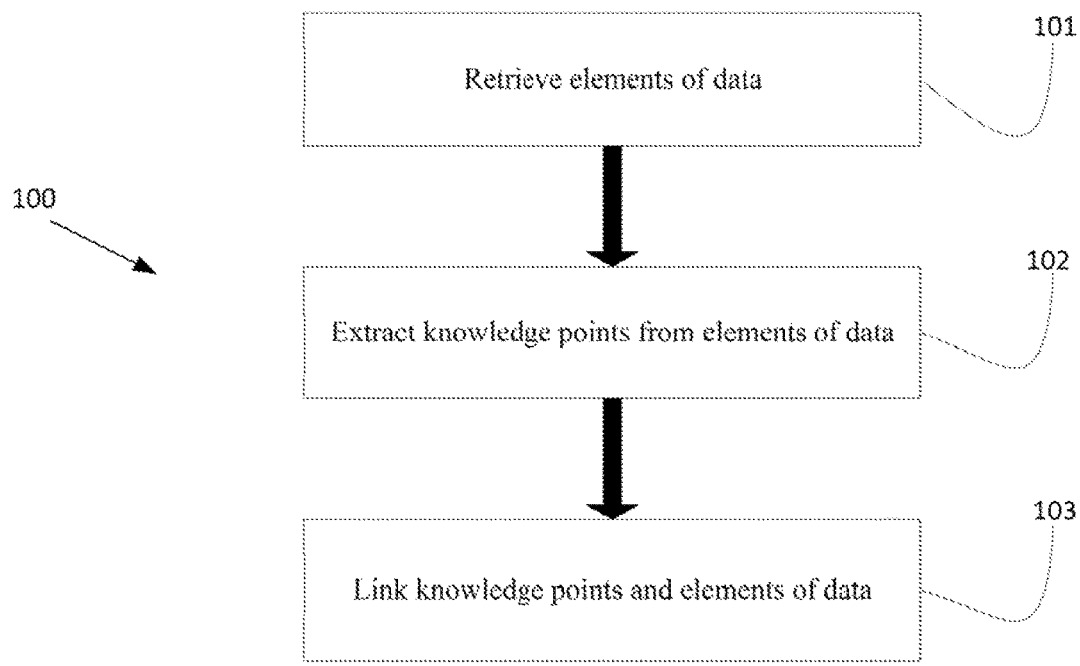
FIG. 1 shows an example process for an information discovery system, according to an implementation of the disclosed subject matter.

Techniques disclosed herein enable an information discovery system, which may allow for the discovery of items of information, or elements of data, related to a particular topic from various sources that may not be surfaced through direct keyword searching. The information discovery system may perform data acquisition, during which various elements of data from any suitable sources, such as, for example, posts from social network sites, may be examined. Knowledge points may be extracted from the elements of data, for example, by knowledge point extractors of the information discovery system. Knowledge points may include, for example, author and recipient information, source site information, and knowledge points including, for example, an industry associated with the elements of data, sentiment expressed in the elements of data, and purchase intent expressed by the elements of data. The determination of such knowledge points may be accomplished by parsing content using Natural Language Processing (NLP) techniques. The extracted knowledge points may be stored by the information discovery system, which may be queryable. The extracted knowledge points may be stored with a link to the original element of data, or document, from which they were extracted, and a weighting that may indicate the relative strength of the link or confidence level that the knowledge point represents some aspect of the linked element of data. The links may provide traversable pathways between documents based on a wide variety of criteria.

The links between knowledge points and elements of data may create a knowledge graph in the information discovery system. The knowledge graph may be traversed based on user defined queries. A user could, for example, identify a knowledge point representing something of interest to the user, such as, for example, social media posts which contain a specific keyword, such as a brand name the user manages. This initial set of seed knowledge points found in response to the criteria set by the user may in turn contain links to a series of additional elements of data, such as documents, which in turn may relate to additional knowledge points. The user may then identify those additional knowledge points which may be of relevance to the user, which would in turn feedback additional sets of elements of data that may be related to the user's initial search. Because links between elements of data may come from the extraction of semantically relevant knowledge points, the chance of encountering relevant data which is not surfaced through direct provision of keywords may be enhanced.

The information discovery system may gather elements of data from any suitable source. For example, the elements of data may be posts made by users to various social networking services, blogs, comment boards, and so on. The elements of data may be gathered based on keyword and image searches, or using bulk retrieval such as web crawling or aggregation from a third party service. The elements of data may be analyzed for all suitable features, such as, for example, natural language processing based features such as named entity or sentiment or custom feature definitions such as the existence of a URL within the element of data. The features may be knowledge points extracted from the elements of data.

The identified features, or knowledge points, may be used as connections to other graphs by establishing the knowledge points as nodes. Connections from the established nodes may allow for discovery from social graphs, which may be based on the connections between people who post to social networking services and may allow assertions around influence, Internet of things correlations and graphs, including the knowledge points position and relationship to other nodes that may be part of the Internet of things, publicly available knowledge graphs which may provide for relative distance between knowledge ontologies, their position in a taxonomy and relationships to other knowledge concepts, document clusters which may identify similar ideas, memes, and viral posts, and NLP extractions, such as phrases and named entity recognition.

The way in which a user interfaces with results returned from searching through information discovery system may be feedback for tuning through explicit utilization. For example, user feedback may be used to override values like sentiment and category, manual categorization, to build or customize lexicons and dictionaries, and to correct any erroneous or otherwise incorrect knowledge points or graph connection.

The user feedback may also be implicit, for example, based on utilization of posts and connections through queries into the system, user engagement, and a social graph seeded by accounts owned by the user or accounts provided or identified by the user, such as accounts belonging to competitors or influencers. These variables may be weighted and then fed back into the information discovery system, which may allow for crawling into additional sources of data and for feed back to the user of additional related elements of data.

According to implementations of the disclosed subject matter, as shown in FIG. 1, a knowledge graph may be constructed. As shown at step 101, elements of data may be retrieved. At step 102, knowledge points may be extracted from the elements of data. At step 103, the knowledge points and the elements of data may be linked.

According to implementations of the disclosed subject matter, at step 101 in FIG. 1, elements of data may be retrieved. For example, the information discovery system may retrieve elements of data, such as documents or posts, from social networking services or any other suitable locations and data sources. The information discovery system may use, for example, the social networking account of a user to retrieve the elements of data, or may be directed to other social networking accounts of interest to the user and may retrieve elements of data which may be publicly available or may be available through an account of the user, or may crawl publicly available websites.

According to implementations of the disclosed subject matter, at step 102, knowledge points may be extracted from the elements of data. For example, knowledge point extractors of the information discovery system may extract knowledge points from the retrieved elements of data. The extracted knowledge points may be, for example, author and recipient information and other metadata, source site information, and key points of the elements of data as evaluated through NLP, sentiment, and linguistic analysis, including industry, product, sentiment, and purchase intent. These extracted knowledge points may be stored in the information discovery system.

According to implementations of the disclosed subject matter, at step 103, the knowledge points and the elements of data may be linked. For example, the information discovery system may include links between knowledge points and the elements of data from which the knowledge points were extracted, with knowledge points that are common between elements of data serving as a link between the elements of data. For example, separate social media posts by the same author may be linked in the information discovery system through the knowledge point of author information for that author. The links may provide traversable pathways between elements of data based on a wide variety of criteria. The links between elements of data and knowledge points may be weighted, for example, with the weight representing a confidence level that the knowledge point accurately describes an aspect of the element of data. For example, the weight of a link between an element of data and knowledge point representing a specific author may represent a level of confidence that the author in the knowledge point is the author of the element of data. An element of data may be linked to any number of knowledge points, and a knowledge point may be linked to any number of elements of data. The knowledge points and linked elements of data may be stored in knowledge graphs. The knowledge graph may store copies of the elements of data or a link to the element of data at its original source. For example, the knowledge graph may include a social media post by storing a copy of the social media post, or by storing a copy of a URL or other locator that may be used to retrieve the social media post from the social media service on which it is hosted.

Figure 2:
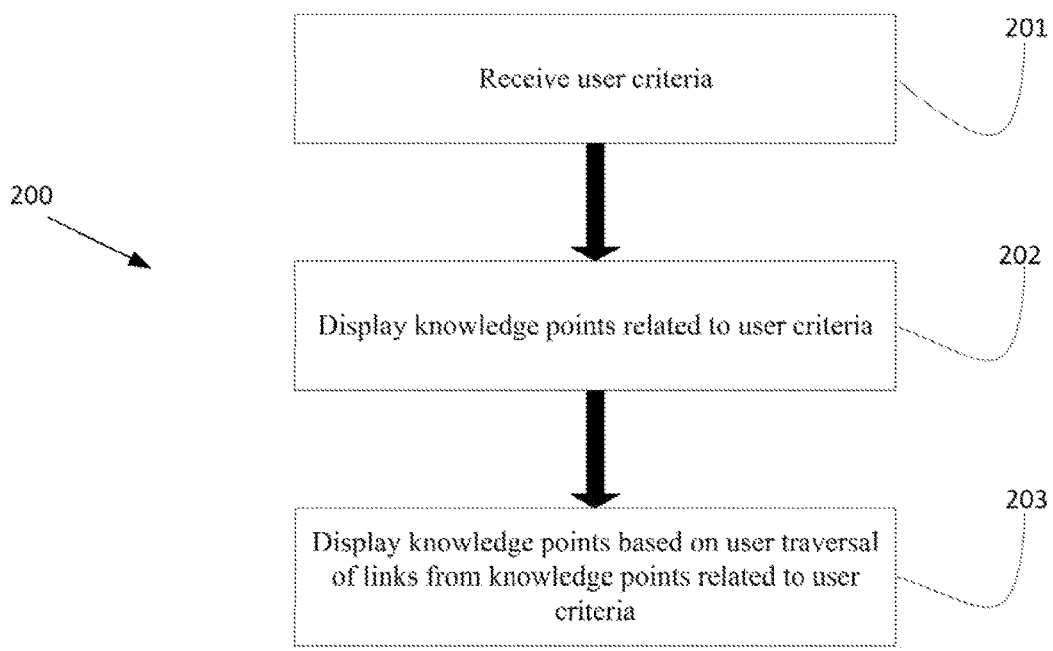
FIG. 2 shows an example process for an information discovery system, according to an implementation of the disclosed subject matter.

According to implementations of the disclosed subject matter, as shown in FIG. 2, a knowledge graph may be searched. As shown at step 201, a user criteria may be received. At step 202, knowledge points related to the user criteria may be displayed. At step 203, knowledge points based on user traversal of links from knowledge points related to user criteria may be displayed.

According to implementations of the disclosed subject matter, at step 201 in FIG. 2, a user criteria may be received. For example, the information discovery system may receive criteria from a user such as, for example, a keyword, phrase, search term, or natural language question that may be of interest to the user. For example, the keyword may be related to a brand managed by the user.

According to implementations of the disclosed subject matter, at step 202, knowledge points related to the user criteria may be displayed. For example, the user criteria may be a keyword used to search the knowledge points stored in the knowledge graph of the information discovery system. Knowledge points which contain the keyword may be displayed to the user. These knowledge points may form a set of seed points from which the user may further explore the knowledge graph. The elements of data linked to the displayed knowledge points may also be displayed to the user. The user may examine the elements of data, for example, viewing documents or social media posts as either copies or at their original source through URL's or other locators included in the knowledge graph.

According to implementations of the disclosed subject matter, at step 203, knowledge points based on user traversal of links from knowledge points related to user criteria may be displayed. For example, the user may traverse the links between elements of data based on links to the knowledge points that were displayed in response to the user criteria. This may result in the display of additional knowledge points as the user traverse the knowledge graph, starting from the seed points. The links may result in knowledge points being displayed to the user which are relevant to the user's criteria but which were not surfaced in the initial search due to, for example, not including the exact keyword the user entered as criteria.

Figure 3:
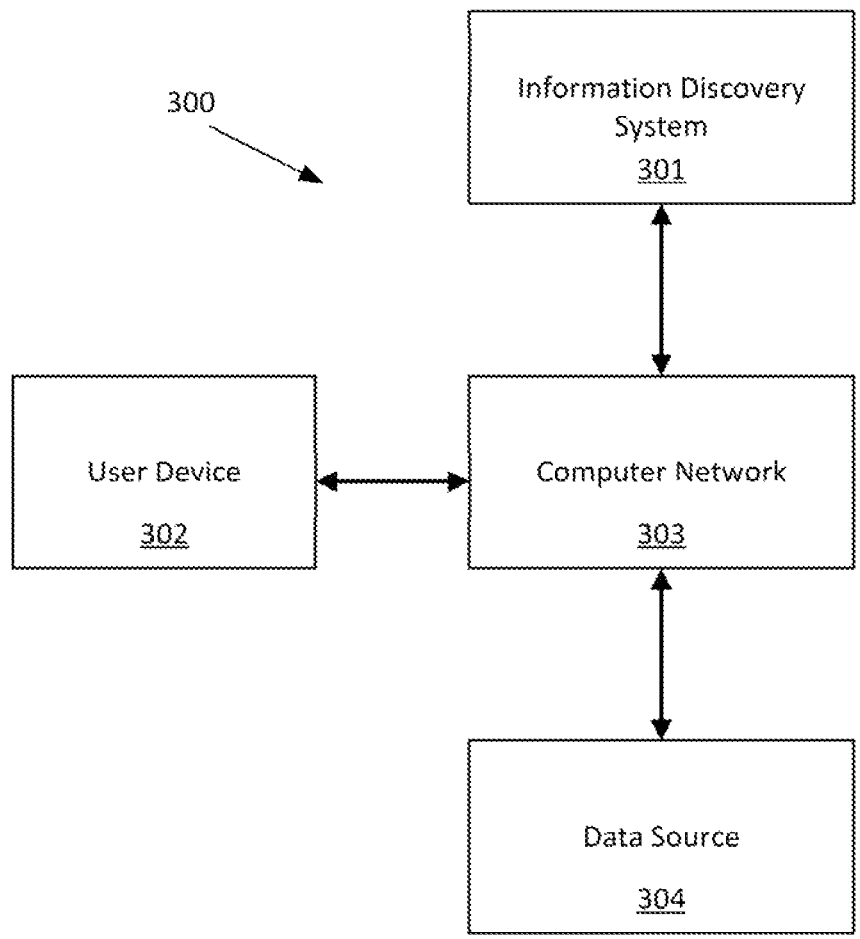
FIG. 3 shows an example system for an information discovery system according to an implementation of the disclosed subject matter.

FIG. 3 shows an example system for an information discovery system. A system 300 may include an information discovery system 301, a user device 302, a computer network 303, and a data source 304. Only one user device 302 is depicted in FIG. 3, although the system 300 may have more than one user device 302 operating at the same time.

The information discovery system 301 may be configured to retrieve elements of data from data sources such as the data source 304, extract knowledge points from the retrieved elements of data, create link between elements of data and knowledge points to create a knowledge graph, and host the knowledge graph so that it is accessible, searchable, and traversable by a user using the user device 302. The information discovery system 301 may include knowledge point extractors, and may employ and suitable techniques such as NLP, or evaluating other elements of an element of data to extract knowledge points from the elements of data retrieved from the data source 304.

The user device 302 may be configured to provide input or receive output to and from the information discovery system 301 in order to carry out one or more of the steps 201, 202, and 203. The information discovery system 301 may include one or more server computers, computing devices, or other such computing systems. The information discovery system 301 include any suitable software, hardware, and componentry, such as, for example, microprocessors, memory systems, input/output devices, device controllers and display systems. The information discovery system may be a single server, or may be number of servers or other computing devise interconnected by suitable hardware and software systems and which collectively can perform any suitable functions of the information discovery system 301, such as, for example, the steps 101, 102, 103, 201, 202, and 203. The user device 302 may include any type of device capable of accessing the information discovery system 301, for example, a smartphone, PDA, tablet, gaming system, personal computer, laptop, and cell phone.

The data source 304 may be any suitable source of elements of data for the information discovery system 301. For example, the data source 304 may be a social networking service hosted on any suitable server system, or a database of any kind that may include elements of data. The data source 304 may be accessible to the information discovery system 301 through the computer network 303, which may be, for example, the Internet.

Each component in the system 300 may communicate with other electronically coupled components through the network 303. The network 303 may include, for example, the Internet, a WAN, LAN, private network, public network, or any other type of computer network. The communication between any component and another computing device may be bidirectional.

Figure 4:
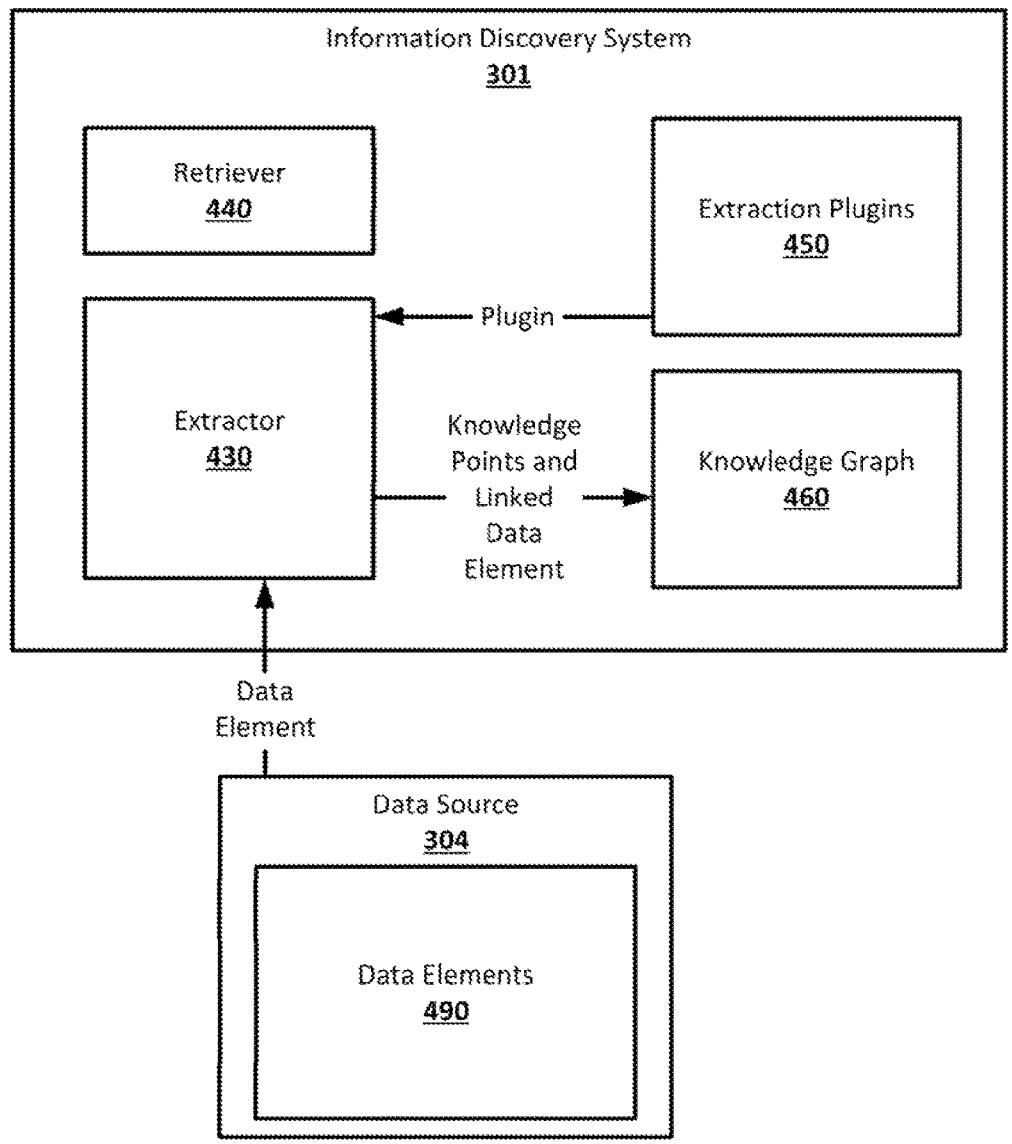
FIG. 4 shows an example system for an information discovery system according to an implementation of the disclosed subject matter.

FIG. 4 shows an example system for an information discovery system according to an implementation of the disclosed subject matter. The information discovery system 301 may be any suitable combination of hardware and software, and may be implemented on any suitable number and arrangement of physical and virtual computing devices connected in any suitable manner. For example, the information discovery system 301 may be a single computer or server, may be server system or cluster, or may be implemented in multiple server systems at separate physical locations.

The information discovery system 301 may include an extractor 430 and a retriever 440, which may both be any suitable combinations of hardware and software. The information discovery system 301 may store extraction plugins 450, which may be any suitable plugin that may be used by the extractor 430 to extract knowledge points from elements of data, such as data elements 490. The information discovery system 301 may store the knowledge graph 460, which may include knowledge points and linked data elements, in any suitable storage. The knowledge graph 460 may also be stored in a suitable storage separately from the information discovery system 301, for example, on a separate server or database system to which the information discovery system 301 is connected using any suitable network connection.

The information discovery system 301 may access the data elements 490 from the data source 304 and may receive a data element, for example, as in step 101. The data source 304 may be any suitable repository of data, including, for example, websites and network services accessible using any suitable network protocols, and may be public or internal. For example, the data source 304 may be a publicly accessible message board, a message board internal to a particular company's network, a news website, a social network, a repository of product reviews on a commercial or review-hosting website, and so on. The data elements 490 may be, for example, message board or social media postings, news articles, or product reviews. The data source 304 may be, for example, a Customer Relationship Management (CRM) platform, which may gather social media and other postings.

The extractor 430 may apply any suitable plugin from the extraction plugins 450 to the data element received from the data source 304 to extract knowledge points from the received data element, for example, as in step 102. The plugins may be for, for example, Natural Language Processing (NLP) analysis including linguistic analysis and subject analysis, sentiment analysis including customer satisfaction analysis and intent to buy analysis, and metadata analysis. For example, a plugin may be used by the extractor 430 to extract a knowledge point from the received data element regarding a product which is the subject of the data element. Another plugin may be used by the extractor 430 to extract a knowledge point from the received data element regarding whether the data element indicates an intent to buy the product which is the subject of the data element.

The extractor 430 may store extracted knowledge points in any suitable format. For example, a knowledge point may be stored as a key/value pair. For example, a knowledge point may a key value of "SENTIMENT", which may indicate the nature of the knowledge point. The value of the knowledge point may then be chosen from a set of values related to sentiment, such as "POSITIVE", "NEGATIVE", "NEUTRAL", "UNKNOWN".

The extractor 430 may build the knowledge graph 460 from data elements and extracted knowledge points, and may extend the knowledge graph 460 with additional data elements and extracted knowledge points. The extractor 430 may link the knowledge points extracted from the data element to the data element in the knowledge graph 460, for example, as in step 103. For example, the extractor 430 may establish a link between the extracted knowledge point of the product that is the subject of the data element and the date element itself. This link may added to the knowledge graph 460. The extracted knowledge point may be stored in the knowledge graph 460, and may be linked either to a copy of the data element, or to some representation of the data element, such as, for example, a URL at which the data element is located. The extractor 430 may weight a link between a knowledge point and a data element. For example, if the extractor 430 used a plugin for sentiment analysis of a data element, there may be a confidence level attached to the knowledge point extracted from the data element. For example, the extractor 430 may determine that there is a 75% chance that the data element indicates an intent to buy a product that is the subject of the data element. The intent to buy knowledge point may be linked to the data element in the knowledge graph 460, and the link may have a weighting of 75%. A higher weighting in a link between a knowledge point and data element may indicate a higher confidence level that the knowledge point accurately describes some aspect of the data element.

Figure 5:
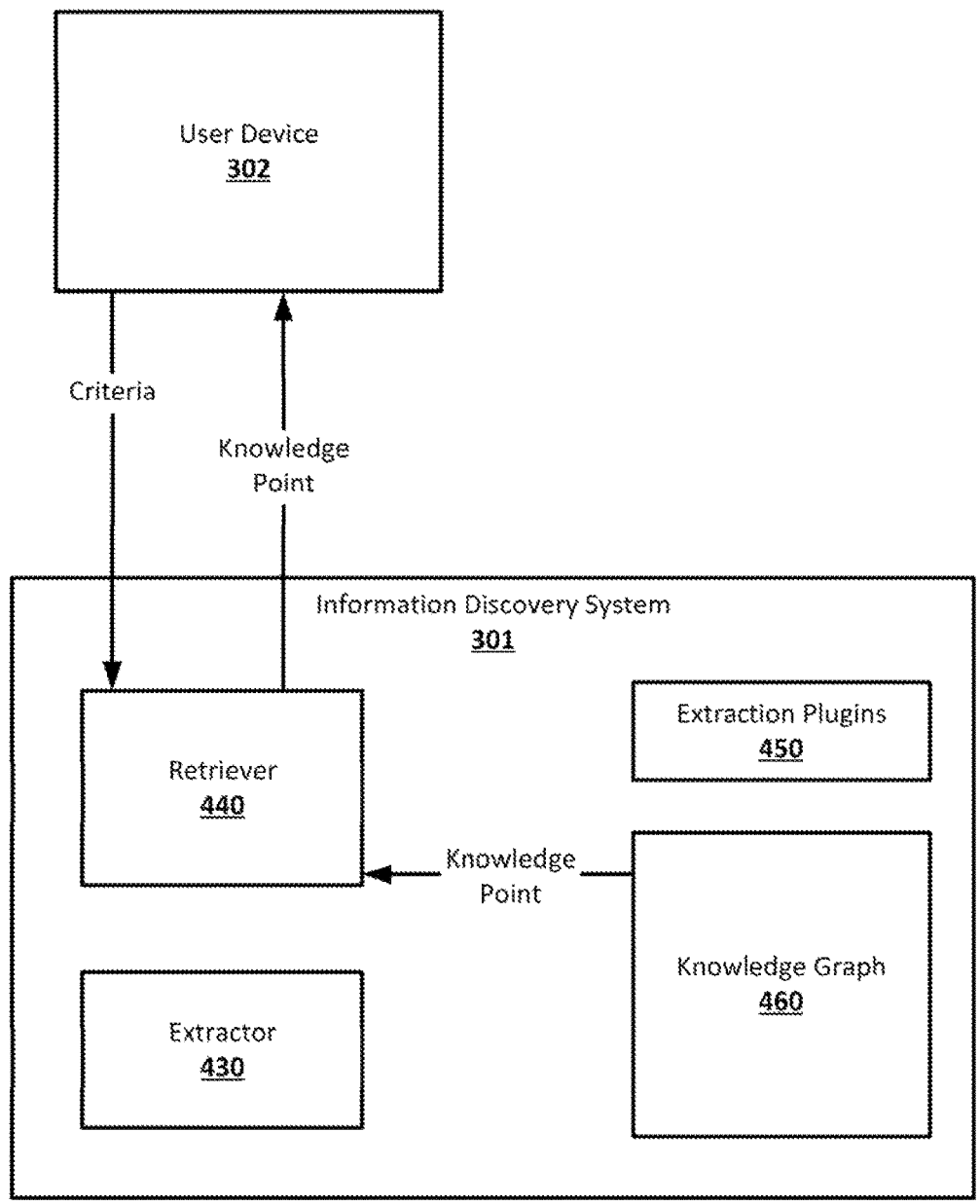
FIG. 5 shows an example system for an information discovery system according to an implementation of the disclosed subject matter.

FIG. 5 shows an example system for an information discovery system according to an implementation of the disclosed subject matter. The user device 302, which may be any suitable computing device such as, for example, a smartphone, PDA, tablet, gaming system, personal computer, laptop, or cell phone, may be used to submit criteria to the information discovery system 301, for example, as in step 201. The criteria may be, for example, a keyword, phrase, metadata item, or natural language question indicating a subject for which the user of the user device 302 wishes to view related data elements.

The retriever 440 may compare the criteria received from the user device 302 to the knowledge points stored in the knowledge graph 460. The retriever 440 may retrieve knowledge points matching the criteria from the knowledge graph 460 and send them to the user device 302 to be displayed to the user, as in step 202. A knowledge point may be matched to the criteria based on, for example, phrase or keyword matching, or based on analysis, for example, NLP, linguistic, or sentiment analysis of the criteria. For example, the criteria may be in the form of a question, and matching knowledge points may be knowledge points that may be linked to data elements that answer the question. The criteria may be based on metadata, for example, indicating the name of an author, and may be matched to knowledge points extracted by a metadata extracting plugin.

Knowledge points may be displayed on the user device 302 using any suitable graphical representation, including, for example, list or graph representations. A user may be able to examine a knowledge point retrieved from the knowledge graph 460 to view the data elements linked to that knowledge point. Data elements, such as the data elements 490, may be viewed at their original source, such as the data source 304, or where a copy is hosted, such as in the knowledge graph 460. For example, a knowledge point may be linked to an article hosted on a website, and to a social media post. The user, with the user device 302, may be able to view the article and the social media post, either through copies sent from knowledge graph 460 to the user device 302 with the knowledge points or on selection of the data elements by the user, or at their original sources, for example, through URL's or other link to the website that hosts the article and social media service that hosts the post.

The user may, using the user device 302, traverse the links from the knowledge points that were related to the criteria and sent from the information discovery system 301 to the user device 302, as in step 203. Each knowledge point may be linked to multiple data elements. The user may select a data element linked to a knowledge point sent to the user device 302 based on the criteria that were sent from the user device 302. The user may then be presented with additional knowledge points that are linked to that selected data element, although these additional knowledge points may not match the criteria that were sent from the user device 302. The additional knowledge points may be linked to additional data elements, which the user may examine, and may select to view even more additional linked knowledge points. Whenever the user selects a data element, the retriever 440 may retrieve the additional knowledge points linked to the selected data element from the knowledge graph 460 and send the additional knowledge points, and additional linked data elements linked to these additional knowledge points, to the user device 302. This may allow a user to explore the knowledge graph 460 based on their originally sent criteria, and traversing links between knowledge points and data elements.

Figure 6:
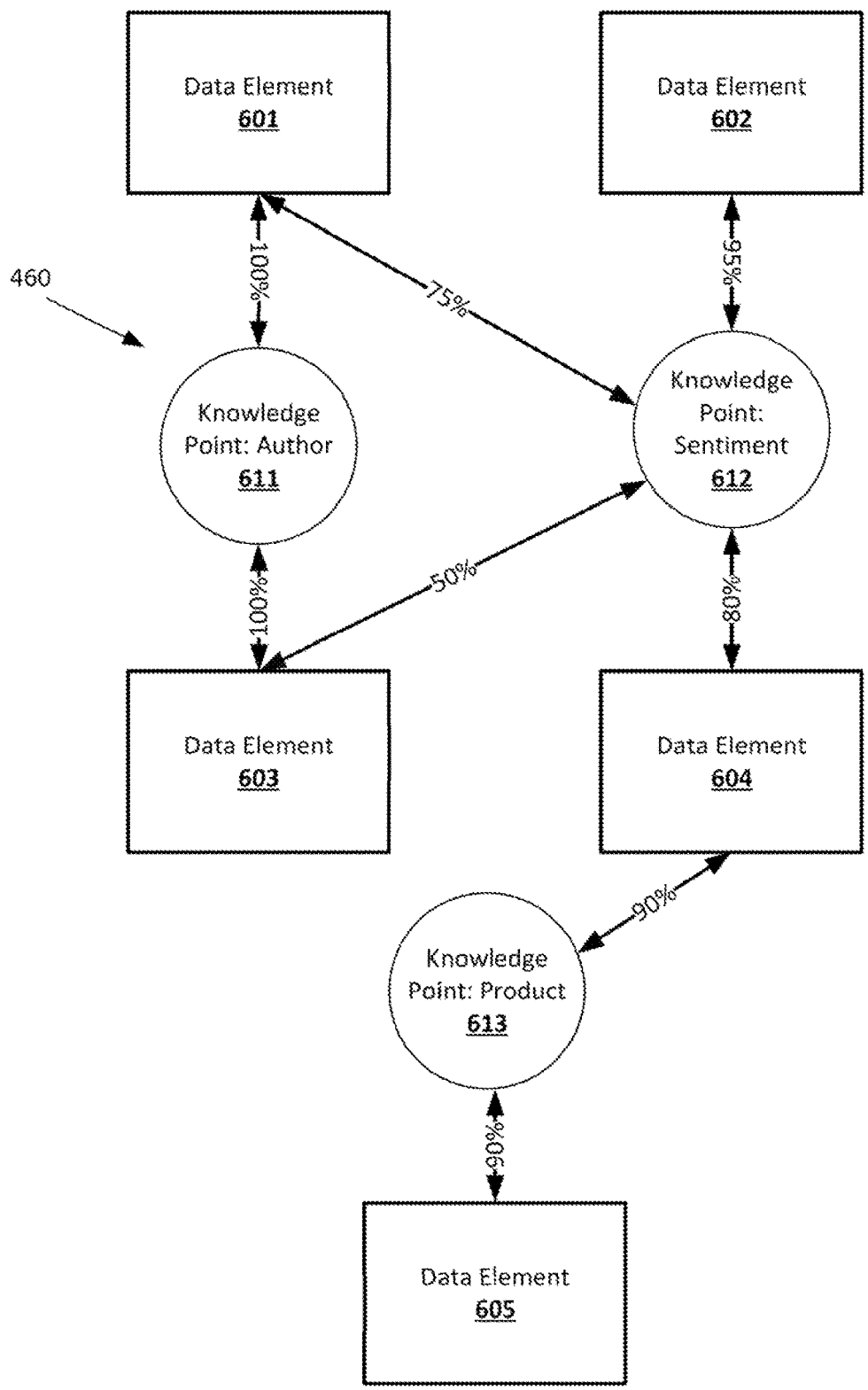
FIG. 6 shows an example knowledge graph for an information discovery system according to an implementation of the disclosed subject matter.

FIG. 6 shows an example knowledge graph for an information discovery system according to an implementation of the disclosed subject matter. Data elements, such as the data elements 601, 602, 603, 604, and 605, may be linked to knowledge points, such as the knowledge points 611, 612, and 613, in the knowledge graph 460. Each of the of the knowledge points 611, 612, and 613, may represent some aspect of a data element, and data elements linked to particular knowledge point may share those aspects. The knowledge point 611 may represent, for example, a specific author. Data elements linked to the knowledge point 611 may be those data elements that were determined, for example, through extraction of metadata or linguistic analysis by the extractor 430, to have been written by that specific author. Thus, the data elements 601 and 603 may be determined to share a common author, the author represented in the knowledge point 611. The knowledge point 613 may represent, for example, a specific product. Data elements linked to the knowledge point 613, for example, the data elements 604 and 605, may be data elements that were determined by the extractor 430 to be about or pertain to the specific product represented by the knowledge point 613.

A user may traverse the knowledge graph 460 across the links between data elements and knowledge points. For example, the criteria received from user device may be the name of a specific author, which may be the author represented by the knowledge point 611. The user device 302 may receive, from the information discovery device 301, the knowledge point 611, which may match the criteria of author name received from the user device 302, and linked data elements 601 and 603. The user may examine the data elements 601 and 603, for example, viewing copies of them or being directed to the original versions on, for example, a website or social media service. The user may also, upon examining the data elements 601 and 603, be presented with the linked knowledge point 612. The user may indicate that they wish to view data elements connected to the knowledge point 612, representing a sentiment, and the retriever 440 may send to the user device 302 the data elements 602 and 604 which are linked to the knowledge point 612. The user may then examine the data elements 602 and 604, as well as the knowledge point 613. The user may the use the knowledge point 613 to receive and view the data element 605. In this way, a user may traverse the knowledge graph 460, and may view data elements that may not turn up based on the initial criteria searched for by the user but might still be relevant to the user's interests. This may allow for the surfacing of relevant data elements beyond the boundaries of results provided by searching on a keyword or phrase.

Each link between a data element and a knowledge point may be weighted to represent a confidence level that the knowledge point accurately describes some aspect of the linked data element. For example, the knowledge point 612 may be a sentiment extracted from the linked data elements 601, 602, 603, and 604, for example, by the extractor 430. The sentiment may be, for example, whether the data elements 601, 602, 603, and 604 indicate satisfaction with some product or service which is the subject of one of the data elements 601, 602, 603, and 604. The product or service may be different for the different data elements, but the sentiment of the knowledge point 612 may be the same, as a data element may only be linked to the knowledge point 612 if the data element includes the sentiment of the knowledge point 612.

The weighting of 95% of the link between the data element 602 and the knowledge point 612 may indicate a 95% confidence that the data element 602 includes the sentiment of the knowledge point 612. For example, the data element 602 may be a blog post about a product which the extractor 430 has determined with 95% confidence indicates customer satisfaction with the product. The weighting of 50% of the link between the data element 603 and the knowledge point 612 may indicate a 50% confidence that the data element 603 includes the sentiment of the knowledge point 612. For example, the data element 603 may be a website article about a product which may contain some ambiguity which may not be resolved entirely by the extractor 430 using any suitable sentiment analysis.

Figure 7:
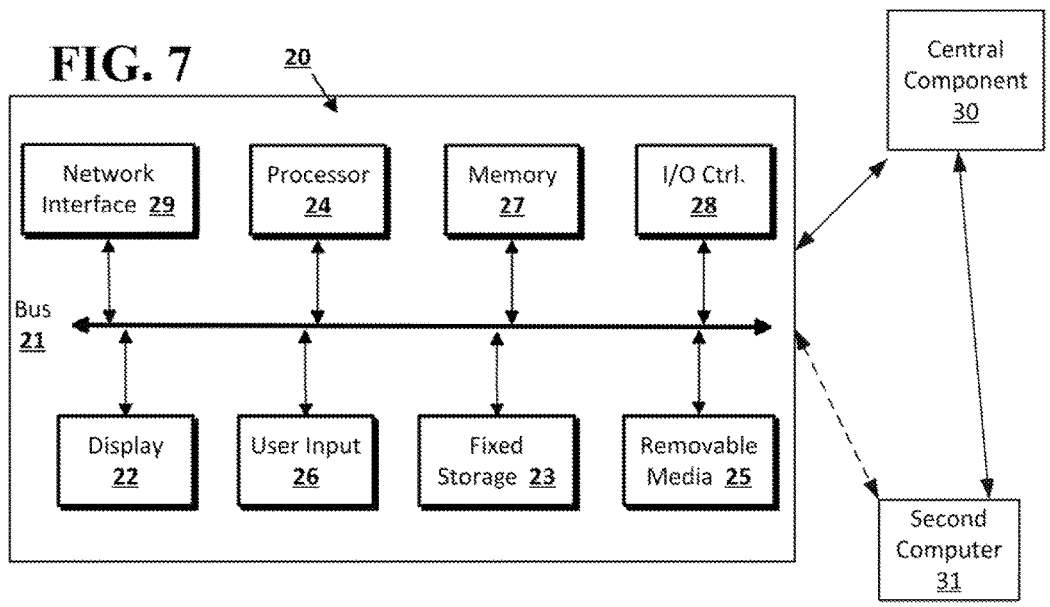
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
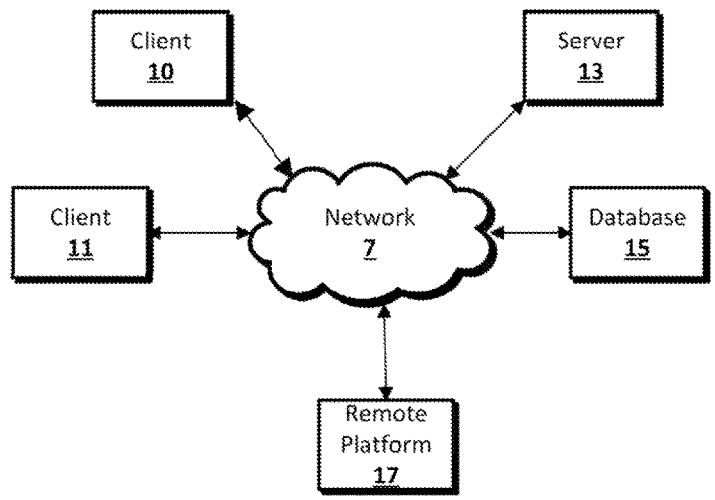
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method for an information discovery system comprising:
   retrieving a first element of data;
   extracting at least one knowledge point from the first element of data using sentiment analysis of the first element of data, wherein the at least one knowledge point comprises an aspect of the first element of data;
   retrieving a second element of data;
   extracting the at least one knowledge point from the second element of data using sentiment analysis of the second element of data;
   linking the first element of data and the at least one knowledge point with a first traversable link, wherein the at least one knowledge point is further linked to a second element of data with a second traversable link;
   receiving at least one user criteria from a user device; matching the at least one knowledge point to the at least one user criteria; identifying the first element of data linked to the at least one knowledge point based on a traversal of the first traversable link between the at least one knowledge point and the first element of data;
   identifying the second element of data linked to the at least one knowledge point based on a traversal of the second traversable link between the at least one knowledge point and the second element of data; and
   sending to the user device the at least one knowledge point matching the at least one user criteria, the identified first element of data, and the identified second element of data.

2. The method of claim 1, further comprising extracting at least one additional knowledge point from the first element of data by determining, using one or more of natural language processing analysis, linguistic analysis, and metadata analysis, a second aspect of the first element of data.

3. The method of claim 1, wherein the aspect of the at least one element of data comprises one item from the group consisting of a sentiment of intent to purchase, and a sentiment of customer satisfaction.

4. The method of claim 1, further comprising, during or after extracting the at least one knowledge point, determining a weighting of the traversable link between the at least one knowledge point and the first element of data.

5. The method of claim 4, wherein the weighting comprises a confidence level that the aspect comprising the knowledge point accurately describes the first element of data.

6. The method of claim 4, wherein the weighting of the traversable link between the at least one knowledge point and the first element of data is different than a weighting of the second traversable link between the at least one knowledge point and the second element of data.

7. The method of claim 1, wherein the first element of data and the second element of data both include the aspect comprising the knowledge point.

8. The method of claim 1, further comprising storing the at least one knowledge point, the first element of data, and the second element of data, in a knowledge graph.

9. The method of claim 8, wherein the first element of data is stored as a copy of the first element of data from a data source for the first element of data or is stored as a link to the first element of data at the original source for the first element of data.

10. The method of claim 9, wherein storing a link to first element of data comprises storing a uniform resource locator (URL).

11. The method of claim 1, wherein the first element of data is a website posting, a message board posting, or a social media service posting.

12. A system for information discovery, the system comprising:
   a storage device configured to store a knowledge graph;
   an information discovery system electronically coupled to the storage and configured to: retrieve a first element of data:
      extract at least one knowledge point from the first element of data using sentiment analysis, wherein the knowledge point comprises an aspect of the first element of data;
      link the first element of data and the at least one knowledge point with a first traversable link, wherein the at least one knowledge point is further linked by a second traversable link to a second element of data from which the at least one knowledge point was extracted using sentiment analysis;
      store the first element of data, the at least one knowledge point, and the second element of data as a part of the knowledge graph in the storage;
      receive at least one user criteria from a user device; match the at least one knowledge point to the at least one user criteria; identify the first element of data linked to the at least one knowledge point based on a traversal of the first traversable link between the at least one knowledge point and the first element of data;
      identify the second element of data linked to the at least one knowledge point based on a traversal of the second traversable link between the at least one knowledge point and the second element of data; and
      send to the user device the least one knowledge point matching the user criteria and the identified first element of data and the identified second element of data linked to the at least one knowledge point.

* * * * *